US009858398B2

(12) United States Patent
Larzul et al.

(10) Patent No.: US 9,858,398 B2
(45) Date of Patent: Jan. 2, 2018

(54) DETERMINISTIC IDENTIFIERS FOR SOURCE CODE ELEMENTS

(71) Applicant: Synopsys, Inc., Mountain View, CA (US)

(72) Inventors: Ludovic Marc Larzul, Folsom, CA (US); Alexander Rabinovitch, Shrewsbury, MA (US)

(73) Assignee: Synopsys, Inc., Mountain View, CA (US)

( * ) Notice: Subject to any disclaimer, the term of this patent is extended or adjusted under 35 U.S.C. 154(b) by 130 days.

(21) Appl. No.: 14/929,112

(22) Filed: Oct. 30, 2015

(65) Prior Publication Data

US 2017/0124305 A1    May 4, 2017

(51) Int. Cl.
  *G06F 21/14*    (2013.01)
  *G06F 21/60*    (2013.01)

(52) U.S. Cl.
  CPC ............ *G06F 21/14* (2013.01); *G06F 21/606* (2013.01); *G06F 2221/0724* (2013.01)

(58) Field of Classification Search
  CPC . G06F 21/14; G06F 21/606; G06F 2221/0724
  See application file for complete search history.

(56) References Cited

U.S. PATENT DOCUMENTS

| | | | | |
|---|---|---|---|---|
| 5,978,476 A * | 11/1999 | Redman | ................... | G06F 21/10 345/468 |
| 6,026,220 A * | 2/2000 | Cleereman | .......... | G06F 17/5045 703/23 |
| 7,454,323 B1 * | 11/2008 | Bain | .................... | G06F 17/5022 703/13 |
| 8,977,863 B1 * | 3/2015 | Arsintescu | .............. | G06F 21/10 713/189 |
| 2005/0071659 A1 * | 3/2005 | Ferguson | ............... | G06Q 40/04 713/193 |
| 2006/0259978 A1 * | 11/2006 | Pikus | .................. | G06F 17/5081 726/26 |
| 2007/0124717 A1 * | 5/2007 | Deur | ....................... | G06F 21/14 716/103 |
| 2007/0266248 A1 * | 11/2007 | Cheng | ..................... | G06F 21/72 713/171 |
| 2008/0086646 A1 * | 4/2008 | Pizano | .................. | H04L 9/3231 713/189 |
| 2008/0159539 A1 * | 7/2008 | Huang | .................. | H04L 9/0866 380/277 |

* cited by examiner

*Primary Examiner* — Hosuk Song
*Assistant Examiner* — J. Brant Murphy
(74) *Attorney, Agent, or Firm* — Fenwick & West LLP

(57) ABSTRACT

Multiple computer systems each include at least one EDA tool that performs certain EDA functions. Each computer system also includes source code of a design with the names of source code elements and an encoding module that generates unique identifiers for the source code elements according to a specific encoding algorithm. The encoding module identifies each source code element included in the source code. For each source code element, the encoding module generates a unique identifier by applying the encoding algorithm to the name of the element. When electronic design information is going to be transmitted to another computer system and the electronic design information includes source code elements, the encoding module encodes the information by replacing each source code element with the unique identifier generated for the element.

16 Claims, 4 Drawing Sheets

DETERMINISTIC IDENTIFIERS FOR SOURCE CODE ELEMENTS

BACKGROUND

1. Field of Art

The disclosure generally relates to EDA tools, and more specifically to generating encoded identifiers for source code elements associated with electronic design description. source code.

2. Description of the Related Art

Integrated circuit designs and circuits today are becoming increasingly complex and engineers need specialized skill set and capabilities to design these circuits. As these skills and capabilities become more specialized, designing a circuit may require cooperative efforts from a number of engineers and the use of several electronic design automation (EDA) tools. The engineers and EDA tools may be at different locations. For example, an engineer may simulate a design using a computer system at one location and transmit the simulation results via a network to another computer system at a different location for another engineer to review the results via a waveform viewer. Hence, descriptions of circuit designs and information related to the designs are constantly being exchanged through potentially unreliable means (e.g., networks).

Typically, to protect information from being read by unauthorized parties during transmission, the information is encrypted by the sender. However, the process of encrypting the information and the recipient decrypting the information can be very time consuming, especially when large amount of information is being exchanged. Thus, there is a need to quickly exchange information in a secure and reliable way.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
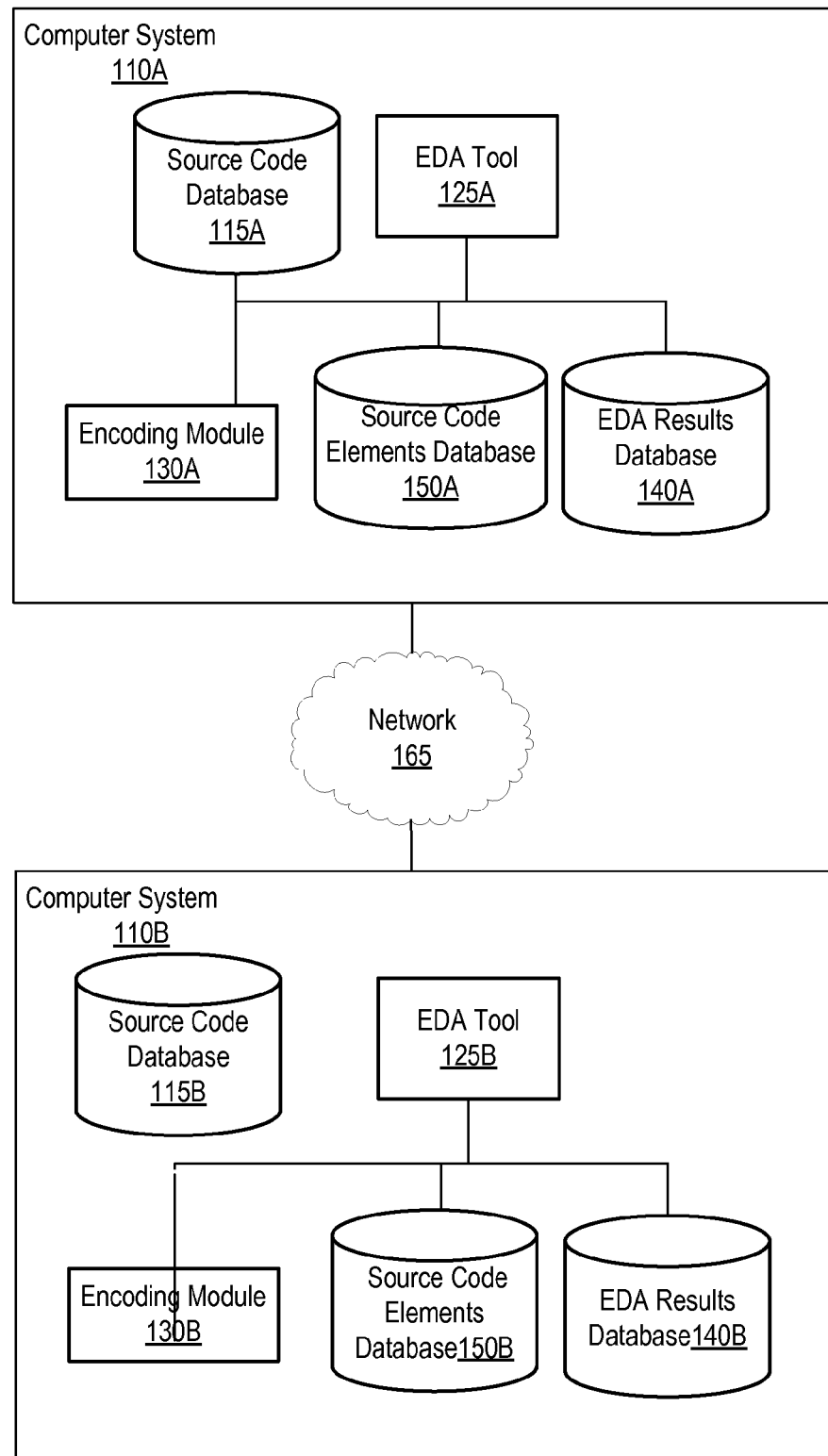
FIG. 1 is a block diagram of a source code element encoding environment, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. The figures depict embodiments of the disclosed system (or method) for purposes of illustration only. It should be recognized from the following description that alternative embodiments of the structures and methods illustrated herein may be employed without departing from the principles described herein.

The figures uses like reference numerals to identify like elements. A letter after a reference numeral, such as "230A," indicates that the text refers specifically to the element having that particular reference numeral. A reference numeral in the text without a following letter, such as "230," refers to any or all of the elements in the figures bearing that reference numeral.

Configuration Overview

A disclosed system, method, and computer system allows for the secure exchange of electronic design information. According to one embodiment, multiple computer systems each include at least one electronic design automation (EDA) tool that performs certain EDA functions to generate electronic design information. For example, one computer system may include a compiler, another computer system may include a simulator, and another computer system may include a waveform generator. Each computer system also includes source code of a design with the names of source code elements and an encoding module that generates unique identifiers for the source code elements according to a specific encoding algorithm. The encoding module identifies each source code element included in the source code. For each source code element, the encoding module generates a unique identifier by applying the encoding algorithm to the name of the element.

When electronic design information is going to be transmitted to another computer system and the electronic design information includes source code elements, the encoding module encodes the information by replacing each source code element with the unique identifier generated for the element. The encoded electronic design information is transmitted to the desired computer system. For example, the electronic design information may be the results from the simulation of the design and simulation results may be transmitted to another computer system for analysis.

The encoding algorithm used to generate the unique identifiers is a one-way encoding algorithm. Hence, only a computer system that includes the original names of the source code elements and the encoding algorithm will be able to map the unique identifiers included in the encoded electronic design information to source code elements. Only an intended recipient of the encoded electronic design information will include the source code element names and encoding algorithm. Therefore, by obscuring the electronic design information with the unique identifiers, the exchange of the information is secure and reliable because even if an unauthorized party gains access to the encoded electronic design information the unauthorized party will not have the source code element names and the encoding algorithm needed to determine what the unique identifiers correspond to. This allows the exchange of the electronic design information to be secure without having to encrypt the information.

Example Source Code Element Encoding System

FIG. 1 is a block diagram illustrating a source code element encoding environment 100, according to one embodiment. The source code element encoding environment 100 includes computer systems 110A and 110B connected via a network 165. FIG. 1 shows only two computer systems 110 for the purpose of understanding, however it should be understood that other embodiments can include many more computer systems 110.

The network 165 represents the communication pathways between the computer systems 110. In one embodiment, the network 165 is the Internet and uses standard communications technologies and/or protocols. The network 165 can also utilize dedicated, custom, or private communications links that are not necessarily part of the Internet. The network 165 may comprise any combination of local area and/or wide area networks, using both wired and wireless communication systems. In another embodiment, the network 165 can be a device including a storage facility that could be connected to the computer system 110.

Exemplary computer systems 110 include electronic devices with internet capability like tablets, desktop computers, and laptop computers. Each computer system 110 includes an source code database 115, an EDA tool 125, an encoding module 130, a source code elements database 150 and an EDA results database 140. In an embodiment, the two computer systems 110A and 110B are physically the same computer system with different environments accessible by different users, each environment being protected from the other one by access rights.

The source code database 115 stores electronic design source code that describes an electronic system design (e.g., integrated circuit (IC) design) or a verification environment for testing and simulating a design. In one embodiment, the electronic design source code is described using a hardware description language (HDL). The electronic design source code includes a number of source code elements including syntaxic and non-syntaxic words, statements, algorithmic constructs, functional statements, design architecture, verification, connective elements and any element that describes an electronic component. Examples of source code elements include signal names, instance names, modules, gates, ports, vectors, types, arrays, memories, bus, probes and other circuit elements.

An example of an electronic design source code is provided below.

```
//Adder/subtractor module
module ADD_SUB(
    input               clk,
    input [7:0]         a0,
    input [7:0]         b0,
    input               doAdd0, // if this is 1, add;
                                 else subtract
    output reg [8:0]    result0
);
always @(posedge clk)
    begin
        if (doAdd0)
            result0 <= a0 + b0;
        else
            result0 <= a0 - b0;
    end
endmodule: ADD_SUB
```

The electronic design source code example above describes a circuit that performs addition or subtraction on an 8 bit input signal and provides the result of the addition or subtraction as an 8 bit output signal. The inputs and outputs of the circuit are described in a module labeled ADD_SUB and the functions of the circuit are described by the section indicated by the always@(posedge clk). Source code elements included in the source code above are the signals clk, a0, b0, doAdd0, result0 and the module ADD_SUB.

The EDA tool 125 is a tool that a user uses to create and/or verify the functionality of electronic system designs (e.g., prior to manufacture). Examples of EDA tools 125 include simulation tools, synthesis tools, waveform viewers, compilers, functional and code coverage tools, testbench analysis tools, static timing analysis tools, placement and routing tools and other such similar tools.

Based on the functionality of the EDA tool 125, the EDA tool 125 generates EDA tool results related to an electronic system design. The EDA tool 125 stores the results in the EDA results database 140. In one embodiment, the EDA tool 125 receives electronic design source code from the source code database 115 written in HDL and compiles it into a computer readable format (e.g. a binary file). The EDA tool 125 further performs computations on the computer readable format to generate EDA tool results. For example, the EDA tool 125 may be a simulator that simulates a design described by the source code and the results from the simulation are EDA tool results stored in the EDA results database 140. In this example, the results from the simulation may include signal values traced during the simulation.

In another embodiment, the EDA tool 125 processes electronic design information (e.g. simulation/emulation results) received from another computer system. For example, a waveform viewer may receive information describing signal values traced during emulation of a design. Based on the signal values, the waveform generator can generate a waveform for each of the traced signals. The waveforms may be stored in the EDA results database 140.

The encoding module 130 (may also be referred to as an encoding generator) generates a unique identifier for each source code element included in electronic design source code. The encoding module 130 retrieves the electronic design source code stored by the source code database 115 and identifies the source code elements included in the source code. If the source code includes multiple instances of a source code element, the encoding module 130 identifies a single instance of the element for generating a unique identifier. For each identified source code element, the encoding module 130 generates a unique identifier based on an encoding algorithm. The encoding module 130 stores each generated unique identifier in the source code elements database 150 along with an indication as to which source code element the unique identifier corresponds (e.g., stores a mapping between the unique identifier and the source code element). For example, the encoding module 130 may store in the source code elements database 150 an indication that unique identifier FY189P54 corresponds to signal CPU.core0.regA.enable.

In one embodiment, the encoding module 130 encodes EDA tool results using the generated unique identifiers. To encode EDA tool results, the encoding module 130 replaces each source code element included in the results with its corresponding unique identifier as indicated by the source code elements database 150. After encoding the EDA tool results, the results can, for example, be safely transmitted to another computer system 110 and/or stored on a remote storage device. Hence, the results are obscured so that an unauthorized party gaining access to results can't determine what the unique identifiers correspond to.

In another embodiment, the encoding module 130 encodes the electronic design source code stored by the source code database 115. The encoding module 130 replaces each source code element included in the source code with its corresponding unique identifier stored in the source code elements database 150. In one embodiment, the encoding module 130 encodes the source code prior to the EDA tool 125 fully processing the source code so that any EDA tool results generated by the EDA tool 125 include the encoded source code elements (results include unique identifier instead of the source code elements). For example, the encoding module 130 may encode the source code during compilation of the source code by the EDA tool 125.

In another embodiment, the encoding module 130 does not store the information that allows matching of a source code element to its unique identifier. Instead, the encoding module 130 transmits the unique identifier directly to the EDA tool 125 without going through the source code elements database 150.

The encoding module 130 also decodes unique identifiers. When the computer system 110 receives EDA tool results from another computer 110 that are related to the source code (e.g., generated using the electronic design source code) and include unique identifiers, the encoding module 130 replaces the unique identifiers with their corresponding source code elements. The encoding module 130 determines, for each unique identifier included in the EDA tool results, the source code element that corresponds to the unique identifier from the source code element database 150. The encoding module 130 replaces the unique identifier in the EDA tool results with the corresponding source code element.

In another embodiment, the encoding module 130 retrieves the source code element directly from the source code database 115 without using a source code elements database 150. In an alternative embodiment, the encoding module does not replace the unique identifier but transmit it to the EDA tool 125 so the EDA tool 125 can use it and still do not store it.

Figure 2:
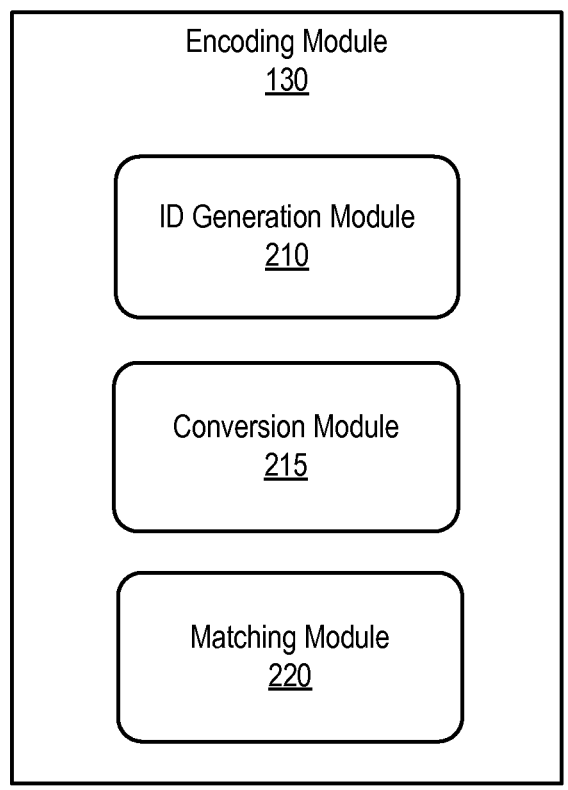
FIG. 2 is a block diagram illustrating an encoding module, according to one embodiment.

FIG. 2 is a block diagram illustrating an encoding module 130, according to one embodiment. The encoding module 130 includes an ID generation module 210, a conversion module 215, and a matching module 220. Those of skill in the art will recognize that other embodiments can have different and/or other modules than the ones described here, and that the functionalities can be distributed among the modules in a different manner.

The ID generation module 210 generates unique identifiers for source code elements. To generate unique identifiers, the ID generation module 210 identifies electronic design source code stored by the source code database 115. The ID generation module 210 may identify the electronic design source code, for example, when the computer system 110 receives the electronic design source code, when the electronic design source code is stored by source code database 115, when a user requests that unique identifiers be generated, when a user requests that the source code be encoded, when a user requests to encode EDA test results generated using the source code, or when a user requests to decode unique identifiers included in the EDA test results.

The ID generation module 210 identifies each unique source code element included in the electronic design source code. In one embodiment, a system administrator provides the ID generation module 210 with characteristics of source code elements so that the ID generation module 210 can use the characteristics to identify the source code elements included in the electronic design source code. For each source code element identified, the ID generation module 210 generates a unique identifier using an encoding algorithm.

The encoding algorithm is a one-way algorithm in that in order to determine the source code element that a unique identifier corresponds to, the source element name and the encoding algorithm are needed. In one embodiment, to generate a unique identifier for a source code element, the ID generation module 210 performs a cyclic redundancy check (CRC) on the name of the source code element. For example, the ID generation module 210 may identify the source code element "c1k0," which is a signal. The ID generation module 210 performs a CRC on "c1k0" resulting in AB078D00 as the unique identifier.

In another embodiment, the encoding algorithm for generating the unique identifiers comprises the ID generation module 210 analyzing the electronic design source code from the start. Each time the ID generation module 210 identifies a unique source code element, the ID generation module 210 adds the source code element to a data container. Examples of data container include a list, a binary tree, a map, a set or any other such data container. For each source code element included in the data container, the ID generation module 210 generates a unique identifier based on the position of the source code element in the data container. In one embodiment, the position number of the source code element in the data container is the unique identifier. For example, if the source code element is the third element in a list, the unique identifier of the element would be "three."

In another embodiment, the encoding algorithm for generating the unique identifiers comprises a random function with deterministic result from an initial seed value. Each time the ID generation module 210 identifies a unique source code element, the ID generation module 210 creates an identifier based on the next random number generated by the random generator. In this embodiment, both computer systems 110A and 110B have the same random number generator and only the seed needs to be transmitted. In an alternative embodiment, multiple initial seed values are used for the random generator.

In another embodiment, the encoding algorithm for generating the unique identifiers comprises generating unique identifiers based on the total number of unique identifiers required for an instance of a source code element. For example, a module (e.g., a type of source code element) may have k instances in the source code of the electronic design. For each instance i1, i2, . . . ik, a corresponding weight is determined, e.g. w(i1), w(i2), . . . , w(ik). The weight is the total number of unique identifiers for the corresponding instance of the module, i.e. W(i) is total number of unique IDs in the sub tree of the instance 'i'. For every module, the weight information is pre-processed into an array made of partial sums. The array corresponds to the design hierarchy of the source code elements in the source code of the electronic design. Example arrays include:

A[0]=W(i1);
A[1]=W(i1)+A[0];
. . .
A[k−1]=W(ik)+A[k−2];

For example, assume a design hierarchy includes cpu0 and cpu1 as two instances of top level design. Further each cpu0 instance may have 4 adder instances, add0, add1, add2 and add3. Each add instance may have 3 unique identifiers in the instance. The weight for each adder instance, i.e. W(add0) . . . W(add3)=3. Now, the array of partial sums is calculated for each cpu instance based on the pre-processed weights. A[add0]=3, A[add1]=6, A[add2]=9 and A[add]=12. The encoding algorithm may transmit a serial number of the source code element. The serial number is computed based on the module instance that contains the source code element. The weighted approach of partial sum of arrays allows faster decoding of a unique identifier at the receiving computer system 110 that has the source code element and the encoding algorithm.

In another embodiment, the encoding algorithm for generating the unique identifiers is local to a portion of the source code, thus allowing the matching module 220 to match a unique identifier to a source code element without possessing the complete source code or accessing the source code elements database 150.

Each generated unique identifier is stored by the ID generation module 210 in the source code elements database 150 or transmitted directly to the EDA tool 125. The ID generation module 210 also stores in source code elements database 150 an indication of the source code element that corresponds to the unique identifier (e.g., an indication that the source code element and the unique identifier map to each other).

The conversion module 215 encodes electronic design information. In one embodiment, when a triggering event occurs related to EDA tool results generated based on the electronic design source code, the conversion module 215 identifies the EDA tool results in the EDA results database 140. The triggering event may be, for example, a user requesting to transmit the EDA tool results to another computer system 110 or a user specifically requesting to encode the EDA tool results.

The conversion module 215 identifies each source code element included in the EDA results. For each identified source element, the conversion module 215 identifies the source code element in the source code elements database 150. Based on the information stored in the source code elements database 150 in association with the source code element, the conversion module 215 determines the unique identifier that corresponds to the source code element. The conversion module 215 replaces the source code element in the EDA tool results with its corresponding unique identifier. In one embodiment, the conversion module 215 stores with the EDA tool results, information indicating that the EDA tool results have been encoded along with an identifier associated with the electronic design source code In another embodiment, the conversion module 215 encodes the electronic design source code stored by the source code database 115 so that EDA test results generated by the EDA tool 125 can be encoded since creation. The conversion module 215 identifies each source code element included in the electronic design source code. For each identified source element, the conversion module 215 determines the unique identifier that corresponds to the source code element as indicated by the source code elements database 150. The conversion module 215 replaces the source code element in the electronic design source code with its corresponding unique identifier.

The matching module 220 decodes EDA information by replacing unique identifiers included in the EDA information with their corresponding source code elements. The electronic design information may be EDA test results (e.g., received from another computer system 110) or any other information related to or generated based on electronic design source code. The matching module 220 initiates the decoding of unique identifiers included in electronic design information, for example, when a user explicitly requests to decode the unique identifiers or when the electronic design information is received by the computer system 110 and included information indicates that the electronic design information is encoded. In one embodiment, the matching module 220 only initiates decoding if the electronic design information includes an identifier associated with electronic design source code stored in the source code database 115. If the electronic design information includes the identifier it signifies that the electronic design information was generated based on the electronic design source code and the matching module 220 can replace the unique identifiers with their corresponding source code elements since the source code database 115 has the electronic design source code.

In one embodiment, if the unique identifiers are distinguishable in the electronic design information (e.g., have specific characteristics, such as specific length and format that distinguish them from additional content included in the information), the matching module 220 identifies the unique identifiers included in the electronic design information. For each unique identifier, the matching module 220 identifies the unique identifier in the source code elements database 150 and determines the source code element that corresponds to the unique identifier. The unique identifier is replaced in the electronic design information with its corresponding source code element.

In an embodiment where the unique identifiers are not distinguishable in the electronic design information (e.g., based on characteristics), the matching module 220 retrieves each unique identifier stored in the source code elements database 150. For each unique identifier, the matching module 220 searches the electronic design information for the unique identifier. The matching module 220 replaces each instance of the unique identifier in the electronic design information with its corresponding source code element as indicated by the source code elements database 150.

In one embodiment, when the unique identifiers are determined based on weights on the design hierarchy. The computer system 110 may transmit a serial number of source code element that is computed based on the module instance that contains the source code element along with the unique identifier. Based on the serial number of the source code element, the element is located. Given a unique identifier, the matching module 220 perform a binary search over the array of the partial sums that corresponds to the electronic design top module. Based on the binary search result, the instance that contains the source code element corresponding to the unique identifier can be determined. The query results are obtained in a time proportional to log K where K is number of instances inside the top module.

Once the sub-hierarchy that contains the source code element corresponding to the unique identifier of the query is identified, the algorithm proceeds similarly to a sub-hierarchy of the determined instance. The maximum number of binary searches required is proportional to the depth of the electronic design hierarchy.

Continuing the example from above regarding cpu0, the matching module 220 may receive a serial number 8 associated with the cpu0 module. The partial sum of arrays for cpu0 as previously processed is [3, 6, 9, and 12]. By performing a binary search, the serial number 8 will correspond to add2 instance in the source code of the electronic design.

Figure 3:
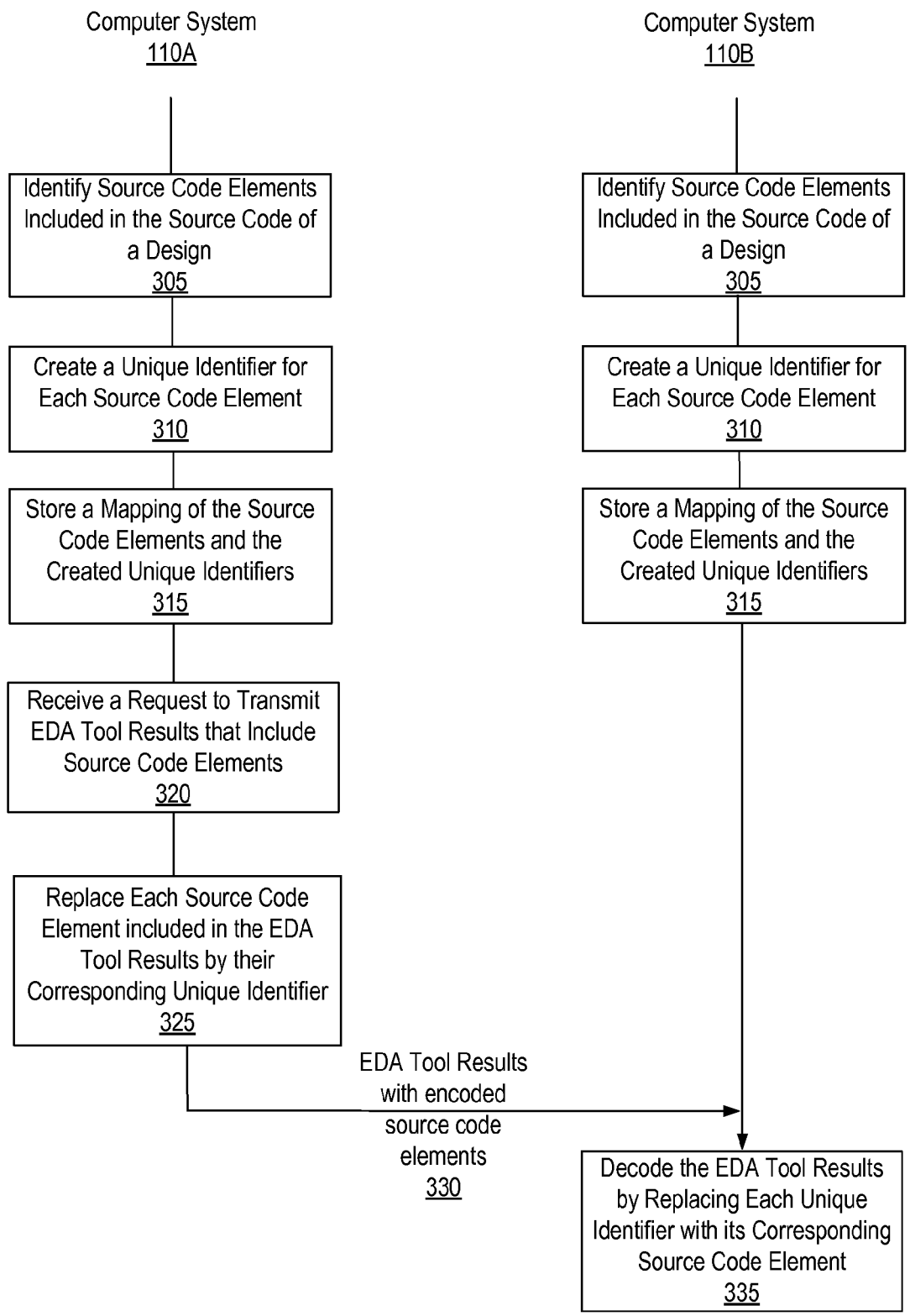
FIG. 3 is an interactive diagram showing interactions between multiple computer systems when exchanging EDA tool results that include encoded source code elements, according to one embodiment.

FIG. 3 is an interactive diagram showing interactions between multiple computer systems 110 when exchanging EDA tool results that include encoded source code elements, according to one embodiment. Those of skill in the art will recognize that other embodiments can perform the steps of FIG. 3 in different orders. Moreover, other embodiments can include different and/or additional steps than the ones described herein.

Assume for purposes of this example that computer systems 110A and 110B both have source code of an electronic system design stored. Additionally, assume that the computer systems 110A and 110B use the same encoding algorithm for encoding source code elements. Steps 305, 310, and 315 are performed by both computer systems 110A and 110B. The steps can be performed at different times.

Each computer system 110A and 110B identifies 305 unique source elements included the electronic design source code. The computer systems 110A and 110B each create 310 a unique identifier for each identified source code element using the same encoding algorithm. Since the computer systems 110A and 110B are using the same encoding algorithms, they both generate the same unique identifiers for the source code elements. The computer systems 110A and 110B each store 315 a mapping indicating which source code element corresponds to each generated unique identifier.

The computer system 110A receives 320 a request to transmit EDA tool results to computer system 110B. The EDA tool results include multiple the source code elements. In one embodiment, the EDA tools results were generated by running the electronic design source code through an EDA tool 125 of the computer system 110A. The computer system 110A replaces 325 each identifiable source code elements included in the EDA tool results with its corresponding unique identifier as indicated by the stored mapping information.

The computer system 110A transmits 330 the EDA tool results, including all the unique identifiers and lacking information from the source code elements, to computer system 110B. Since the computer system 110B has the electronic design source code and generated unique identifiers using the same encoding algorithm, the computer system 110B has the same stored mapping information and can properly replace the unique identifiers included in the transmitted EDA tool results 320 with the corresponding source code elements. The computer system 110B decodes 335 the unique identifiers included in the EDA tool results by replacing each unique identifier included in the EDA tool results with its corresponding source code element as indicated by the mapping information stored by the computer system 110B, if they are available. The decided EDA tool results can then be, for example, displayed to a user of the computer system 110B or processed by an EDA tool of the computer system 110B.

In another embodiment, the computer system 110B does not have a source code database 115B and a source code elements database 150B. However, it can still extract information from the EDA tool results by post-processing and reporting supplementary results based on the unique identifiers. These post-processing results can then be used by an operator or a program on the computer 110A.

Computing Machine Architecture

Figure 4:
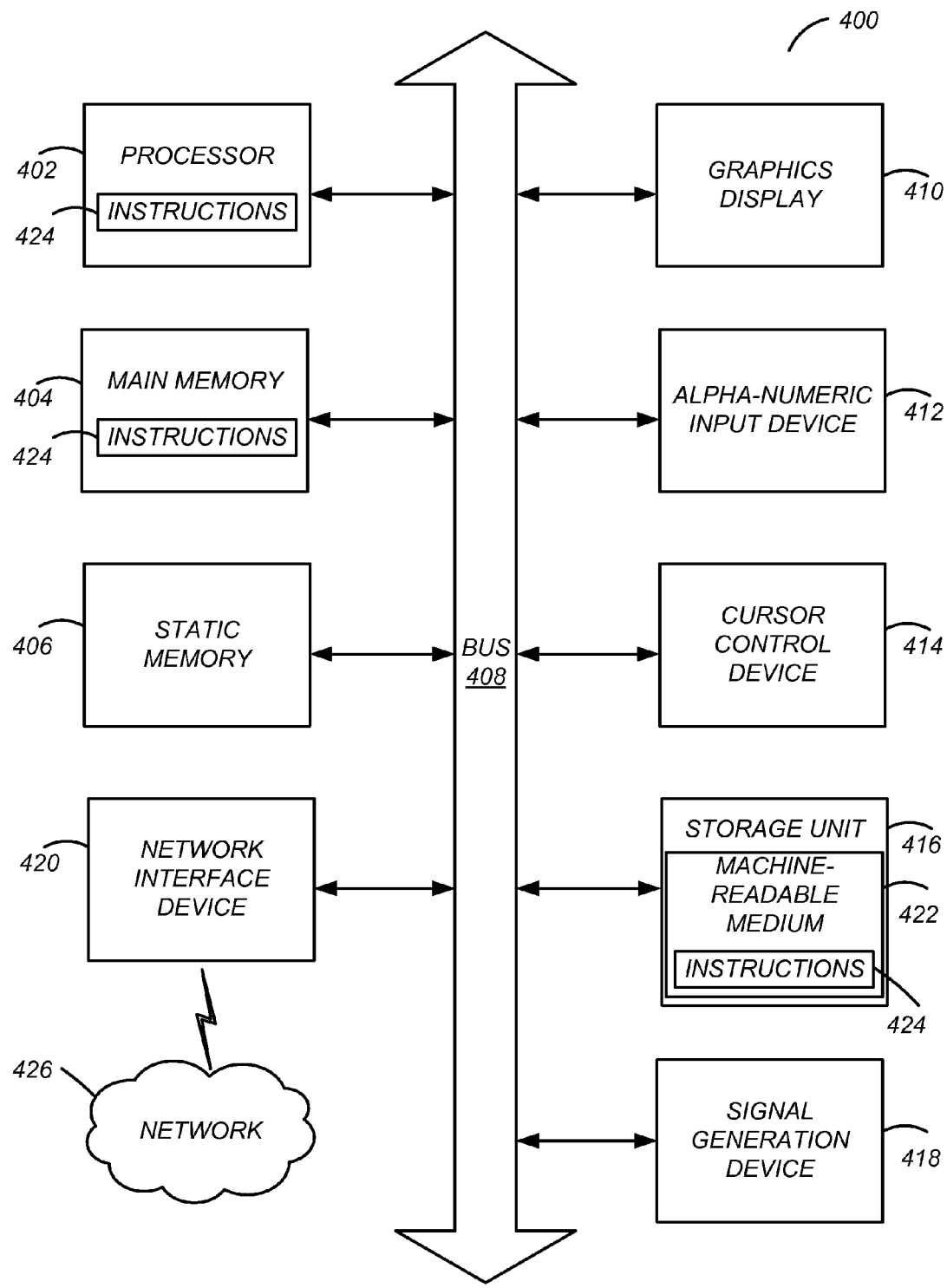
FIG. 4 illustrates an embodiment of components of an example machine able to read instructions from a machine-readable medium and execute them in a processor (or controller).

Turning now to FIG. 4, it is a block diagram illustrating components of an example machine able to read instructions from a machine-readable medium and execute them in a processor (or controller). Specifically, FIG. 4 shows a diagrammatic representation of a machine in the example form of a computer system 400 within which instructions 424 (e.g., software or program code) for causing the machine to perform (execute) any one or more of the methodologies described with FIGS. 1-3. The computer system 400 may be used for one or more of the entities (e.g., computer system 110) illustrated in the emulation environment 100 of FIG. 1.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or a cathode ray tube (CRT)). The computer system 400 may also include alphanumeric input device 412 (e.g., a keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. Hardware module implemented herein may be implemented in dedicated and permanently configured circuitry, or in temporarily configured circuitry (e.g., configured by software).

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for bandwidth efficient logic analysis of digital logic circuits through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   identifying, by a computer system, a source code element included in a source code of an electronic design;
   generating, by the computer system, a unique identifier for the source code element using an encoding algorithm;
   obscuring, by the computer system, the source code element in information generated by an electronic design automation (EDA) tool using the unique identifier, wherein the source code element cannot be identified from the information without possession of the encoding algorithm and the source code element; and transmitting the information including the unique identifier to an additional EDA tool without the source code element, wherein the additional EDA tool is on an additional computer system including the source code element and the encoding algorithm.

2. The computer-implemented method of claim 1, wherein obscuring the source code element comprises replacing the source code element with the unique identifier in the information.

3. The computer-implemented method of claim 1, wherein the encoding algorithm comprises:
   performing a cyclic redundancy check on the source code element to generate the unique identifier.

4. The computer-implemented method of claim 1, wherein the source code comprises a plurality of source code elements and the encoding algorithm comprises:
   analyzing the source code, during analysis of the source code:
   responsive to identifying a source code element in the source code that is not included in a data container, adding the identified source code element to the data container; and
   generating a unique identifier for each source code element included in the data container based on a position of the source code element in the data container.

5. The computer-implemented method of claim 1, wherein the source code describes at least one of an Application Specific Integrated Component (ASIC), a System-On-Chip (SOC) or an electronic system including an ASIC or a SOC.

6. The computer-implemented method of claim 1, wherein the source code describes a verification environment for an electronic system design.

7. A computer-implemented method comprising:
   identifying, by a first computer system executing an electronic design automation (EDA) tool, a source code element included in a source code of an electronic design;
   generating, by the first computer system, a unique identifier for the source code element using an encoding algorithm;
   receiving, by the first computer system from a second computer system, electronic design information including the unique identifier and not including the source code element, the second computer system including the source code element, the encoding algorithm, and an additional EDA tool; and
   replacing, by the first computer system, the unique identifier included in the electronic design information with the source code element.

8. The computer-implemented method of claim 7, wherein information indicating that the unique identifier corresponds to the source code element is stored in a database.

9. The computer-implemented method of claim 7, further comprising:
   identifying the unique identifier in the electronic design information based on characteristics associated with unique identifiers;
   searching a database for the unique identifier, the database storing information indicating that the unique identifier corresponds to the source code element; and
   determining based on the stored information that the source code element corresponds to the unique identifier.

10. The computer-implemented method of claim 7, wherein the electronic design information with the source code element is processed by the EDA tool.

11. The computer-implemented method of claim 7, further comprising:
   displaying the received electronic design information with the source code element.

12. A computer system comprising a non-transitory computer-readable storage medium containing computer program code for:
   identifying, by a computer system, a source code element included in a source code of an electronic design;
   generating, by the computer system, a unique identifier for the source code element using an encoding algorithm;
   obscuring, by the computer system, the source code element in information generated by an electronic design automation (EDA) tool using the unique identifier, wherein the source code element cannot be identified from the information without possession of the encoding algorithm and the source code element; and
   transmitting the information including the unique identifier to an additional EDA tool without the source code element, wherein the additional EDA tool is on an additional computer system including the source code element and the encoding algorithm.

13. The computer system of claim 12, wherein obscuring the source code element further comprises replacing the source code element with the unique identifier in the information.

14. The computer system of claim 12, wherein the encoding algorithm comprises:
   performing a cyclic redundancy check on the source code element to generate the unique identifier.

15. The computer system of claim 12, wherein the electronic design source code comprises a plurality of source code elements and the encoding algorithm comprises:
   analyzing the electronic design source code, during analysis of the source code:
   responsive to identifying a source code element in the source code that is not included in a data container, adding the identified source code element to the data container; and
   generating a unique identifier for each source code element included in the data container based on a position of the source code element in the data container.

16. The computer program product of claim 12, wherein the source code describes at least one of an Application Specific Integrated Component (ASIC), a System-On-Chip (SOC) or an electronic system including an ASIC or a SOC.

* * * * *